United States Patent Office

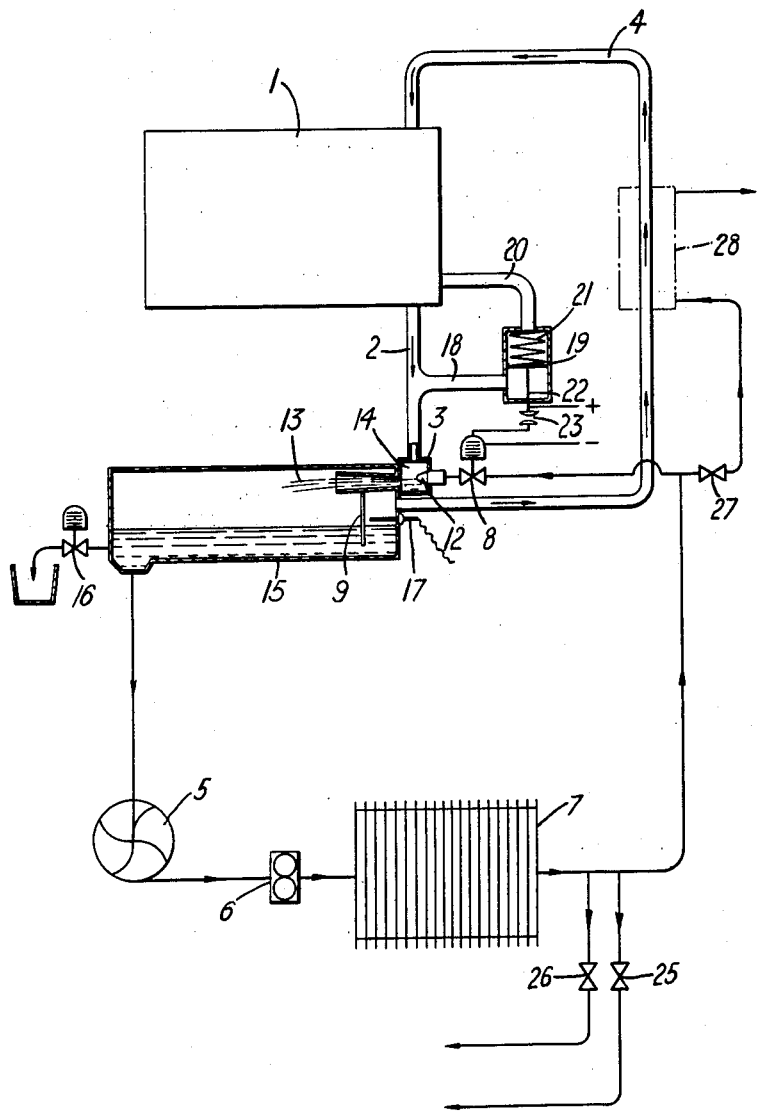

3,112,228
Patented Nov. 26, 1963

3,112,228
ELECTRIC FUEL CELLS
Henry John Young, Histon, England, assignor to National Research Development Corporation, London, England
Filed Jan. 23, 1961, Ser. No. 84,106
Claims priority, application Great Britain Jan. 25, 1960
3 Claims. (Cl. 136—86)

This invention relates to fuel cells of the hydrogen-oxygen type using porous nickel electrodes. During the operation of such a cell water tends to accumulate in the vicinity of the hydrogen electrode and requires to be removed in order to maintain the correct concentration of electrolyte. For this purpose the hydrogen supplied to the cell may be circulated so as to carry away water vapour which may then be condensed and released to atmosphere.

According to the present invention the hydrogen circulation system of such a fuel cell includes a water-powered injector serving as a source of pressure difference for circulating the hydrogen. The pressure difference produced by the injector allows rapid circulation of the hydrogen as required and the mixing of the warm hydrogen from the cell with the cold water spray from the injector leads to efficient condensation of the water vapour carried by the hydrogen. Any normal type of pump may be used for the water circulation and since it does not pump the hydrogen directly, it does not need to be glandless.

Preferably, the circulation system also includes a condenser which receives the spray from the injector and condensed water vapour from the circulated hydrogen and this is connected to the suction of the pump supplying the injector. The pump thus works in a closed circuit which may also include a water cooler for reducing the temperature of the water after its contact with the warm hydrogen.

The hydrogen does not require to be circulated continuously but may be controlled by means of a solenoid valve operated in response to the differential pressure between the hydrogen and the electrolyte in the cell. In the absence of hydrogen circulation water vapour accumulates in the cell, thus increasing the volume of electrolyte and thus forcing some of the hydrogen out of the cells of the porous electrodes. This reduces the differential pressure between the hydrogen and the electrolyte and this reduction of differential pressure serves to operate the valve to start the circulation of hydrogen. This carries away water vapour and reduces the volume of electrolyte, thus increasing the differential pressure again until the solenoid valve is operated to stop the circulation again. In this way water vapour is removed from the cell at the same rate as it is produced.

Apparatus in accordance with the invention will now be described with reference to the example shown in the accompanying schematic drawing.

A battery shown as 1 comprises a number of hydrogen-oxygen fuel cells connected in series, the details of which are not shown. Hydrogen leaves the battery of cells by a pipe 2 and after passing round a closed circuit, which includes a water injector 3, returns to the battery of cells again by way of a pipe 4. The water injector 3 is supplied by a water pump shown diagrammatically as 5, the circuit from which also includes a twin-filter 6, a cooler 7 and a solenoid valve 8. Both the hydrogen and the water, therefore, pass around separate closed circuits.

Water from the nozzles 12 of the injector emerges at 13 in the form of a fine spray and it is the reduced pressure in the intermediate chamber 14 which produces the circulation of the hydrogen round the pipes 2 and 4. The hydrogen drawn down the pipe 2 mixes with the spray from the nozzle 12 and is thereby cooled, the water vapour carried with the hydrogen being condensed to mix with the spray.

The mixed condensate and spray collect in a receiver and condenser 15 from which the suction of the pump 5 is drawn. The heat from the hydrogen which passes to the water in the receiver 15 is removed by the cooler 7. Condensate from the receiver 15 is released periodically by means of a solenoid valve 16 operated by a capacitance probe 17 when the water level becomes excessive. The receiver 15 is divided into two compartments by a close mesh partition 9. The compartment to the left of this partition receives the spray while the smaller compartment which is not subjected to the turbulence in the larger has a steady level and acts on the capacitance probe.

The solenoid valve 8 is controlled by the differential pressure between the hydrogen and the electrolyte in the battery of cells 1. For this purpose hydrogen from the pipe 2 is connected by means of a pipe 18 so as to act on the underside of a diaphragm 19, the upper side of which is connected to the electrolyte by way of a pipe 20, the excess pressure of the hydrogen being balanced by a light spring 21. As the differential pressure drops, so the diaphragm 19 is forced downwardly and a stem 22 connected to the diaphragm closes a pair of contacts 23 connected in the supply to the valve 8. This opens the valve and allows water to flow to the injector 3 to produce the necessary circulation of hydrogen. As water vapour is removed from the cell, so the differential pressure increases until the diaphragm 19 is moved upwardly again to open the contacts 23 and thus close the valve 8.

The water circulated by the pump 5 may also be used for further purposes. For example, water may be tapped off by way of a valve 25 for return to the cell in the vicinity of the oxygen electrodes in order to overcome the concentration effect in the electrolyte caused by the operation of the cell. A further supply may be drawn off through a valve 26 for operating automatic control gear. Finally, yet a further supply of water may be drawn off through a valve 27 so as to pass through an after-cooler shown in dotted lines as 28, this water then returning to the suction of the pump 5 by a connection not shown. The after-cooler 28 produces additional cooling of the hydrogen if required just before it re-enters the cell.

I claim:

1. Fuel cell apparatus of the hydrogen-oxygen type comprising in combination:
   a battery of cells containing electrolyte,
   a circulation system for hydrogen supplied to said battery of cells including,
   conduit means leaving the battery of cells at one point and returning thereto at a second point,
   a fluid injector connected in said conduit means for injecting fluid into hydrogen contained within said conduit means, and
   means for supplying aqueous fluid to said injector under a pressure greater than the fluid pressure existing in said conduit means at the point of connection of said injector thereto whereby a quantity of aqueous fluid may be injected into said conduit means thereby causing a drop in pressure within the conduit at said point of connection producing a flow of hydrogen along said conduit.

2. Fuel cell apparatus of the hydrogen-oxygen type comprising in combination:
   a battery of cells containing electrolyte,
   a circulation system for hydrogen supplied to said battery of cells including,
   conduit means leaving the battery of cells at one point and returning thereto at a second point,
   a water injector connected in said conduit means downstream of said point of leaving for injecting water into hydrogen contained within said conduit means,
a condenser connected into said conduit means downstream of said injector to receive water sprayed from the injector and condensed water vapor from said hydrogen, and
a fluid pump connected to said condenser for supplying water from the condenser to said injector at a pressure greater than the fluid pressure existing in said conduit means at the point of connection of the injector whereby water sprayed from the injector into said conduit means results in a drop in pressure downstream of said battery of cells producing a flow of hydrogen along said conduit.

3. A fuel cell apparatus as claimed in claim 1 in which the circulation of hydrogen is controlled by a solenoid valve operated in response to the differential pressure between the hydrogen and said electrolyte.

References Cited in the file of this patent

UNITED STATES PATENTS

| | | |
|---|---|---|
| 2,304,151 | Crawford | Dec. 8, 1942 |
| 2,384,463 | Gunn et al. | Sept. 11, 1945 |
| 2,901,524 | Gorin et al. | Aug. 25, 1959 |